(12) United States Patent
Hojo et al.

(10) Patent No.: US 11,318,706 B2
(45) Date of Patent: May 3, 2022

(54) WEAR-RESISTANT COATING FILM, WEAR-RESISTANT MEMBER, METHOD FOR PRODUCING WEAR-RESISTANT COATING FILM, AND SLIDING MECHANISM

(71) Applicant: TEIKOKU ION CO., LTD., Higashiosaka (JP)

(72) Inventors: Masafumi Hojo, Higashiosaka (JP); Takashi Nakamura, Higashiosaka (JP); Takuya Kawawaki, Higashiosaka (JP); Ryosuke Nakamura, Higashiosaka (JP); Mitsuhiko Terashita, Higashiosaka (JP)

(73) Assignee: TEIKOKU ION CO., LTD, Higashiosaka (JP)

( * ) Notice: Subject to any disclaimer, the term of this patent is extended or adjusted under 35 U.S.C. 154(b) by 0 days.

(21) Appl. No.: 17/056,926

(22) PCT Filed: May 21, 2019

(86) PCT No.: PCT/JP2019/020182
§ 371 (c)(1),
(2) Date: Nov. 19, 2020

(87) PCT Pub. No.: WO2019/225624
PCT Pub. Date: Nov. 28, 2019

(65) Prior Publication Data
US 2021/0206138 A1 Jul. 8, 2021

(30) Foreign Application Priority Data
May 22, 2018 (JP) .............................. JP2018-097855

(51) Int. Cl.
*B22F 7/02* (2006.01)
*B32B 5/16* (2006.01)
(Continued)

(52) U.S. Cl.
CPC ................ *B32B 5/16* (2013.01); *B32B 15/04* (2013.01); *B32B 38/0012* (2013.01);
(Continued)

(58) Field of Classification Search
None
See application file for complete search history.

(56) References Cited

U.S. PATENT DOCUMENTS

| 4,678,738 A | 7/1987 | Shimizu et al. |
| 6,224,963 B1 * | 5/2001 | Strangman ................ C23C 4/18 |
| | | 428/137 |

(Continued)

FOREIGN PATENT DOCUMENTS

| CN | 104995418 B | 8/2017 |
| JP | 53-46441 A | 4/1978 |

(Continued)

OTHER PUBLICATIONS

International Search Report dated Jul. 2, 2019, issued in counterpart International Application No. PCT/JP2019/020182. (2 pages).
(Continued)

*Primary Examiner* — Seth Dumbris
(74) *Attorney, Agent, or Firm* — WHDA, LLP

(57) ABSTRACT

A wear-resistant coating film is disclosed that can maintain high wear resistance for a long period of time even when it is subjected to repetitive wear, and a method for producing the film, as well as a wear-resistant component. The wear-resistant coating film 10 includes a plated layer 11, lump parts 2, and a coat layer 13. The plated layer and the coat layer are laminated, and each of the lump parts is formed of a single particle 12 and/or an assembly of particles 12. The lump parts 2 are held by the plated layer 11 and are disposed to protrude from the plated layer 11. The coat layer 13 is formed to coat the surface of the plated layer 11, the lump
(Continued)

parts 2 have flat portions 18, and the flat portions 18 are placed on the same plane as the surface of the coat layer 13.

13 Claims, 10 Drawing Sheets

(51) Int. Cl.
  *B32B 15/04* (2006.01)
  *B32B 38/00* (2006.01)
  *F16C 33/12* (2006.01)
  *F16C 33/14* (2006.01)
  *F16C 33/24* (2006.01)
(52) U.S. Cl.
  CPC .............. *F16C 33/12* (2013.01); *F16C 33/14* (2013.01); *F16C 33/24* (2013.01); *B32B 2038/0052* (2013.01); *B32B 2264/0242* (2013.01); *B32B 2264/108* (2013.01); *Y10T 428/12063* (2015.01)

(56) References Cited

U.S. PATENT DOCUMENTS

| | | | |
|---|---|---|---|
| 7,947,381 B2 * | 5/2011 | Yasui | ...................... C23C 18/32 428/680 |
| 2002/0060159 A1 | 5/2002 | Shimizu | |
| 2003/0207149 A1 * | 11/2003 | Kobayashi | .............. F16C 33/14 428/672 |
| 2016/0376721 A1 * | 12/2016 | Konno | ................. A61B 17/062 606/210 |
| 2018/0216478 A1 * | 8/2018 | Martel | .................. F01D 11/122 |

FOREIGN PATENT DOCUMENTS

| | | |
|---|---|---|
| JP | 61-166962 A | 7/1986 |
| JP | 2007-332454 A | 12/2007 |
| JP | 2008-249077 A | 10/2008 |
| JP | 2015-92009 A | 5/2015 |
| JP | 2015-217580 A | 12/2015 |
| JP | 2016-211727 A | 12/2016 |
| JP | 2017-2948 A | 1/2017 |
| KR | 10-2002-0025826 A | 4/2002 |
| WO | 2015/147401 A1 | 10/2015 |

OTHER PUBLICATIONS

Office Action dated Jan. 11, 2022, issued in counterpart Korean Application No. 10-2020-7036221 (10 pages; w/ English machine translation).

\* cited by examiner

WEAR-RESISTANT COATING FILM, WEAR-RESISTANT MEMBER, METHOD FOR PRODUCING WEAR-RESISTANT COATING FILM, AND SLIDING MECHANISM

TECHNICAL FIELD

The present invention relates to a wear-resistant coating film, a wear-resistant component, a method for producing the wear-resistant coating film, and a sliding mechanism.

BACKGROUND ART

There has been demand for imparting high wear resistance to various machine parts, tools, mold components, and the like, and various technologies have been investigated. Particularly in recent years, the wear resistance of various parts has been improved by forming a coating film with excellent wear resistance on the surface of a component by plating etc.

For example, Patent Literature 1 suggests a technique for increasing wear resistance by forming a coating film on a component to be plated using a composite plating solution containing molybdenum disulfide. Further, in Patent Literature 2, a coating film containing polytetrafluoroethylene (PTFE) and Ni is formed on a sliding component to thereby improve wear resistance and maintain sliding performance.

CITATION LIST

Patent Literature

PTL 1: JP2007-332454A
PTL 2: JP2015-092009A

SUMMARY OF INVENTION

Technical Problem

Conventional wear-resistant coating films can reliably improve the wear resistance of various components; however, when the coating films are subjected to repetitive wear over a long period of time, there is a problem that phenomena such as the scraping and degradation of the coating films gradually proceed, and that the durability of the coating films becomes poor. With respect to the wear resistance of various components, there has been demand for wear-resistant coating films that can maintain high wear resistance over a long period of time even when the coating films are subjected to repetitive wear; however, the conventional technique has problems with durability, and thus, further improvement has been desired.

The present invention has been made in light of the above, and aims to provide a wear-resistant coating film that can maintain high wear resistance for a long period of time even when it is subjected to repetitive wear, and a method for producing the film, as well as a wear-resistant component.

Solution to Problem

The present inventors conducted extensive research to achieve the above object. As a result, they found that the object can be achieved by incorporating particle-containing lump parts into a wear-resistant coating film, and forming flat portions in the lump parts. The present invention has thus been accomplished.

Specifically, the present invention includes the subject matter described in the following items.

Item 1
A wear-resistant coating film comprising a plated layer, lump parts, and a coat layer,
wherein
the plated layer and the coat layer are laminated in this order,
each of the lump parts is formed of a single particle and/or an assembly of particles,
the lump parts are held by the plated layer and are disposed so as to protrude from the plated layer,
the coat layer is formed to coat the surface of the plated layer,
the lump parts have flat portions, and the flat portions are placed on the same plane as the surface of the coat layer.

Item 2.
The wear-resistant coating film according to Item 1, wherein the lump parts are placed at predetermined intervals.

Item 3
The wear-resistant coating film according to Item 1 or 2, wherein the particle includes at least one member selected from the group consisting of diamond particles, carbon particles, polytetrafluoroethylene particles, and molybdenum disulfide particles.

Item 4
The wear-resistant coating film according to any one of Items 1 to 3, wherein the coat layer includes at least one member selected from the group consisting of chromium, silver, polytetrafluoroethylene-nickel composites, nickel, nickel-phosphorus, tin, and copper.

Item 5
A wear-resistant component comprising the wear-resistant coating film according to any one of Items 1 to 4 and a base material, wherein
the base material is coated with the wear-resistant coating film, and the wear-resistant coating film on the plated layer side is adhered to the base material.

Item 6
A method for producing the wear-resistant coating film according to any one of claims 1 to 4, comprising the following steps in this order:
making, on the base material, holes for placing the lump parts;
placing the lump parts in the holes;
performing a first plating treatment to form the plated layer; and
performing a second plating treatment to form the coat layer on the plated layer.

Item 7
A sliding mechanism comprising a first sliding component and a second sliding component, wherein
the first sliding component is the wear-resistant component according to Item 5.

Item 8
The sliding mechanism according to Item 7, wherein
the second sliding component has a sliding surface coated with a hard metal layer, and grooves are formed on the surface of the hard metal layer.

Item 9
The sliding mechanism according to Item 8, wherein the grooves have a depth of 5 to 50 μm.

Item 10
The sliding mechanism according to Item 8 or 9, wherein the hard metal layer comprises chromium.

Advantageous Effects of Invention

The wear-resistant coating film of the present invention has high wear resistance. In particular, the wear-resistant coating film of the present invention can maintain high wear resistance over a long period of time even when it is subjected to repetitive wear.

BRIEF DESCRIPTION OF DRAWINGS

FIG. 6(a) shows the measurement results of the depth of wear, and FIG. 6(b) shows the measurement results of the coefficient of friction.

FIG. 7(a) shows the first sliding component of Examples 2 or 4 and FIG. 7(b) shows the first sliding component of Examples 3 or 5.

DESCRIPTION OF EMBODIMENTS

Embodiments of the present invention will be described in detail below.

1. Wear-Resistant Coating Film

Figure 1A:
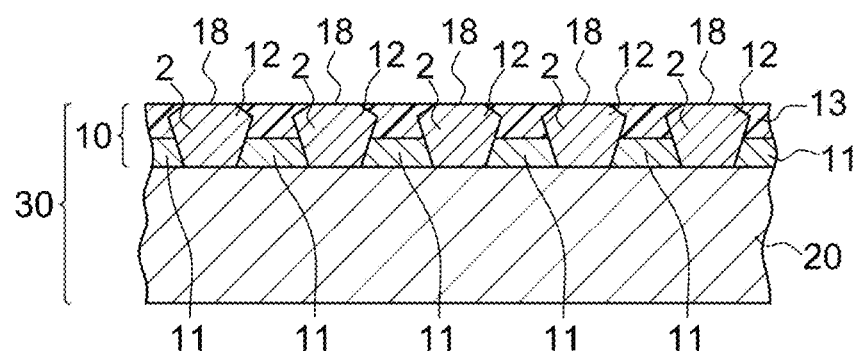
FIG. 1(a) is a cross-sectional view showing an example of a wear-resistant component comprising the wear-resistant coating film of the present invention.

FIGS. 1(a) and (b) are cross-sectional schematic views each showing an example of a wear-resistant component 30 comprising the wear-resistant coating film 10 according to this embodiment. The wear-resistant component 30 includes the wear-resistant coating film 10 and a base material 20.

The wear-resistant coating film 10 according to this embodiment includes a plated layer 11, lump parts 2, and a coat layer 13. The plated layer 11 and the coat layer 13 are laminated in this order.

As shown in FIG. 1, in the wear-resistant coating film 10 according to this embodiment, each of the lump parts 2 is formed of a single particle 12 and/or an assembly of particles 12. The lump parts 2 are held by the plated layer 11, and are provided to protrude from the plated layer 11. The coat layer 13 is formed so as to coat the surface of the plated layer 11. The lump parts 2 have flat portions 18, and the flat portions 18 are placed on the same plane as the surface of the coat layer.

Plated Layer

In the wear-resistant coating film 10 according to this embodiment, the plated layer 11 is a layer formed by a plating treatment. The plated layer 11 is a layer formed, for example, by electroplating, electroless plating, or like methods.

The plated layer 11 is a layer having the role of holding the particles 12 in the wear-resistant coating film 10. The plated layer 11 is provided so as not to cover over the particles 12.

Examples of the plated layer 11 include plated layers of various metals. The metal that forms the plated layer 11 is not particularly limited. Examples of metals include nickel, nickel-phosphorus composites, zinc, cobalt, tin, copper, and silver. The nickel-phosphorus composite may be a mixture or an alloy of nickel and phosphorus.

One or more metals can be used for forming the plated layer 11. The metal that forms the plated layer 11 can also be an alloy. Alternatively, the metal that forms the plated layer 11 can be an oxide, nitride, sulfide, or the like. In addition to or in place of the metal, other elements (e.g., non-metallic elements such as phosphorus and boron) can be used as constituent elements for the plated layer 11.

Other than the above, the plated layer 11 may be a composite plating in which plating of a metal such as Ni used as a base is combined with fluorine resin (PTFE), mica, alumina ($Al_2O_3$), boron nitride (BN), silicon carbide (SiC), molybdenum disulfide ($MoS_2$), tungsten disulfide ($WS_2$), silicon dioxide ($SiO_2$), or the like.

Examples of the plated layer 11 include a layer plated with hard nickel (electroless nickel-plated layer) and an electroless nickel-phosphorus composite plated layer, both formed by an electroless plating treatment. If the plated layer 11 is an electroless nickel-phosphorus composite plated layer, the hardness and corrosion resistance of the plated layer 11 can be increased by the effect of co-deposited phosphorous. The layer plated with hard nickel refers to a nickel-plated layer having an Hv of 200 to 550 (preferably 310 to 500). Examples of the plated layer 11 include a hard nickel layer formed by adding an additive such as saccharin or butin diol, and performing electroplating. When the layer plated with hard nickel is used as the plated layer 11, a known brightening agent is incorporated in the plated layer 11, thus forming a hard coating film with an Hv of 300 to 550.

The thickness of the plated layer 11 is not particularly limited, and can be a thickness in such a range that the particles 12 can be fixed. For example, the thickness of the plated layer 11 can be 0.1 µm to 1 mm, more preferably 1 to 100 µm, and particularly preferably 1 to 10 µm.

The plated layer 11 may have a laminated structure. For example, the plated layer 11 may have a laminated structure including a first layer for temporarily fixing the lump parts 2 and a second layer for more firmly fixing the particles. The first layer has a thickness of, for example, 1 to 10 µm. The second layer has a thickness of, for example, ¼ to ¾ of the average diameter of the lump part 2 described below. The diameter of the lump part 2 refers to the diameter when the lump part 2 is assumed to be a sphere. The diameter of the lump part 2 is the arithmetic mean of the circular equivalent diameters of ten lump parts 2 that are randomly selected by using an image obtained by direct observation with a microscope.

When the plated layer 11 has a laminated structure, the first layer can be a layer formed by electroplating and the second layer can be a layer formed by electroless plating. In this case, for example, the second layer, or the first layer, can be placed on the coat layer 13 side.

The method for forming the plated layer 11 is not particularly limited. For example, the plated layer 11 can be formed by various known methods. Examples of the method for forming the plated layer 11 include electroplating, electroless plating, hot-dip plating, vapor-phase plating, and the like. The plating treatment may be performed either continuously or in batches.

Lump Part

In the wear-resistant coating film 10 according to this embodiment, a plurality of lump parts 2 are provided, and each lump part 2 is provided to protrude above the surface of the plated layer 11. The lump parts 2 can serve as a support prop towards the thickness direction of the wear-resistant coating film 10, and can have a function of maintaining the wear resistance of the wear-resistant coating film 10 for a long period of time.

As shown in FIGS. 1(a) and (b), each of the lump parts 2 is formed of a single particle 12 and/or an assembly of particles 12. Specifically, there may be an embodiment in which each of the lump parts 2 is formed of a single particle 12 (see FIG. 1(a)), an embodiment in which each of the lump parts 2 is formed of an assembly of particles 12 (see FIG. 1(b)), and an embodiment that includes both the lump parts 2, each of which is formed of a single particle 12, and the lump parts 2, each of which is formed by an assembly of particles 12.

The kind of particles 12 contained in the lump parts 2 is not particularly limited. Known materials can be used as the particles 12. Examples include diamond particles, carbon particles, polytetrafluoroethylene particles, molybdenum disulfide particles, zirconia particles, CBN particles, alumina particles, silica particles, silicon carbide particles, boron carbide particles, and inorganic materials that can be used as abrasive grains, such as abrasive materials. Of these, because the wear resistance of the wear-resistant coating film 10 is more easily improved, the particles 12 preferably include at least one member selected from the group consisting of diamond particles, carbon particles, polytetrafluoroethylene particles, and molybdenum disulfide particles. The particles 12 may be formed of one kind of particles or two or more different kinds of particles. As the particles 12, various commercially available particles can be used.

The particles 12 may have holes. In this case, when the wear-resistant coating film 10 is impregnated in oil, the oil also penetrates into the holes of the particles 12, and thus, the oil retention properties can be exhibited.

The shape of the particles 12 is not particularly limited. The particles 12 should not be spherical, and preferably have a distorted shape, such as a shape with a convex surface because the particles 12 having such a shape are easily held by the plated layer 11.

Figure 1B:
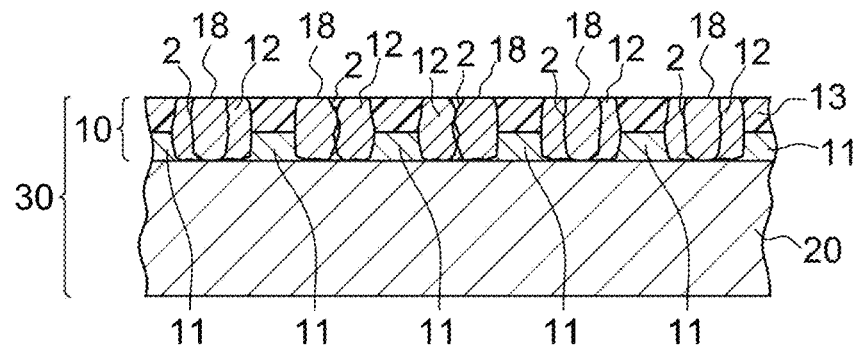
FIG. 1(b) is a cross-sectional view showing another example of a wear-resistant component comprising the wear-resistant coating film of the present invention.

As shown in FIG. 1(b), when the lump part 2 is formed of an assembly of particles 12, the assembly of particles 12 is formed by assembling a plurality of particles 12. When the lump part 2 is formed of an assembly of particles 12, the kind of particles 12 forming the assembly are the same as the kind of the particles 12 used when the lump part 2 is formed of a single particle.

The size of the particles 12 is not particularly limited. For example, if the lump part 2 is formed of a single particle, the particle 12 is viewed as a sphere and has a diameter greater than the thickness of the plated layer 11. Specifically, the particle 12 viewed as a sphere can have an average diameter of 0.5 to 200 μm, preferably 1 to 100 μm, and more preferably 10 to 50 μm. For example, when the particle 12 is a diamond particle, its average diameter is preferably 10 to 100 μm. When the lump part 2 is formed of a single particle, the average diameter of the particle 12 corresponds to the average diameter of the lump part 2.

When the lump part 2 is formed of an assembly of particles 12, the assembly can be viewed as a sphere and have an average diameter of 0.5 to 200 μm, preferably 1 to 100 μm, and more preferably 10 to 50 μm. The particles 12 forming the assembly can be suitably set so that the size of the assembly is within the above ranges. For example, when the particles 12 are diamond particles, their average diameter is preferably 10 to 100 μm. When the lump part 2 is formed of the assembly of particles 12, the average diameter of the assembly corresponds to the average diameter of the lump part 2.

When the lump part 2 is formed of the assembly of particles 12, the lump part 2 preferably includes 2 to 10 particles 12, more preferably 2 to 8 particles 12, even more preferably 3 to 6 particles 12, and particularly preferably 3 to 5 particles 12. The lump part 2 formed of the assembly of particles 12 can inhibit a decrease in wear resistance even if some of the particles 12 fall out during wear.

In the wear-resistant coating film 10 according to this embodiment, the part of each of the lump parts 2 is held by the plated layer 11.

The amount of the lump part 2 in the wear-resistant coating film 10 is not particularly limited. For example, when the lump parts 2 are contained in 10 to 90 vol % relative to the wear-resistant coating film 10, the effect of the present invention can be significantly exhibited. The area percentage occupied by the lump parts 2 on the surface of the wear-resistant coating film 10 according to this embodiment is preferably 5 to 70%.

Each lump part 2 is provided in such a manner that the part of the lump part 2 protrudes from the surface of the plated layer 11. For example, the lump part 2 can protrude above the surface of the plated layer 11 toward the coat layer 13 side by more than half the total thickness.

As described below, flat portions 18 are formed in the lump parts 2. The flat portions 18 are placed on the same plane as the surface of the coat layer 13 in the wear-resistant coating film 10 according to this embodiment. Details are explained in the "Flat Portion" section below.

Coat Layer

The coat layer 13 is a layer formed so as to at least coat the surface of the plated layer 11 in the wear-resistant coating film 10. The coat layer 13 is positioned at the top surface of the wear-resistant coating film 10, and can provide wear resistance and slidability with the base material 20 etc.

The coat layer 13 can be formed of a known material having wear resistance. Examples of the coat layer 13 include coating films formed of various materials such as resins and metals.

Examples of resins include fluorine-based resins. Examples of fluorine-based resins include polytetrafluoroethylene (PTFE), tetrafluoroethylene-perfluoroalkyl vinyl ether copolymers, tetrafluoroethylene-hexafluoropropylene copolymers, polychlorotrifluoroethylene, and tetrafluoroethylene-ethylene copolymers. The fluorine-based resins may be in the form of particles. One or more fluorine-based resins can be contained.

Examples of metals include nickel, chromium, copper, tin, silver, titanium, iron, and molybdenum. One or more metals can be contained. The metal forming the coat layer 13 can be an alloy. Alternatively, the metal forming the coat layer 13 can be an oxide, a nitride, a sulfide, or the like. Further, the coat layer 13 can be composed of other elements (e.g., non-metallic elements such as phosphorus and boron) in addition to or in place of the metal.

The coat layer 13 can also include both resin and metal. When the coat layer 13 includes both resin and metal, its mixing ratio is not particularly limited. The resin and the metal can be mixed at a suitable mixing ratio to attain desired wear resistance.

The coat layer 13 preferably includes at least one member selected from the group consisting of chromium, silver, polytetrafluoroethylene-nickel composites, nickel, tin, and copper. In this case, the wear resistance of the wear-resistant coating film 10 is more easily improved. Examples of polytetrafluoroethylene-nickel composites include a mixture containing polytetrafluoroethylene and nickel, or a mixture consisting of polytetrafluoroethylene and nickel.

The coat layer 13 may be formed of only one kind of a material, or two or more different kinds of materials.

The method for forming the coat layer 13 is not particularly limited. For example, a known method for forming a coating film can be used. Specifically, the coat layer 13 can be formed by a plating treatment method such as electroplating, electroless plating, hot-dip plating, or gas phase plating; or by various other methods, such as coating or sputtering. The plating treatment method may be performed either continuously or in batches. The coat layer 13 is preferably formed by an electroless plating treatment.

In the wear-resistant coating film 10 according to this embodiment, the coat layer 13 is formed so that the flat portions 18 of the lump parts 2 are exposed on the surface, as described below.

The thickness of the coat layer 13 is not particularly limited. For example, the thickness of the coat layer 13 can be at least 1 μm. The upper limit of the thickness of the coat layer 13 can be suitably determined according to the thickness of the plated layer 11, and can be adjusted to a thickness in such a range that the coat layer 13 can cover all the exposed portions of the particles 12.

Flat Portion

As shown in FIG. 1, the flat portions 18 are formed in the lump parts 2, and are placed on the same plane as the surface of the coat layer 13. Specifically, when the lump part 2 is formed of a single particle 12, a flat portion 18 is formed in the single particle 12, and the flat portion 18 is placed on the same plane as the surface of the coat layer 13 (see FIG. 1(a)). When the lump part 2 is formed of an assembly of particles 12, a flat portion 18 is formed in the assembly, and the flat portion 18 is placed on the same plane as the surface of the coat layer 13 (see FIG. 1(b)).

In the present invention, the flat portion 18 being placed on the same plane as the surface of the coat layer 13 means that, when the cross section of the wear-resistant component is observed by SEM, the protrusion height of the flat portion 18 relative to the coat layer 13 is 3 μm or less, more preferably 1 μm or less, and particularly preferably 0.1 μm or less.

The method for forming the flat portion 18 in the lump part 2 is not particularly limited. For example, the lump part 2 is shaved together with the coat layer 13 by grinding the surface of the coat layer 13, thereby forming the flat portion 18 in the lump part 2.

Since the flat portions 18 are formed in the lump parts 2 and the flat portions 18 are placed on the same plane as the surface of the coat layer 13, the wear-resistant coating film 10 has an improved wear resistance and excellent durability, and can easily prevent damage to a worn component. Further, the flat portions 18 may be subjected to a chamfering process to form Rs at the corners of the flat portions 18. This further facilitates the prevention of damage to a component to be worn.

The area occupied by the flat portion is preferably 1 to 50% relative to the area occupied by one lump part 2. In this case, the wear-resistant coating film 10 attains further improved wear resistance and significantly high durability, and can easily prevent damage to a worn component.

Other Structures and Actions of Wear-Resistant Coating Film

In one embodiment of the wear-resistant coating film 10 according to this embodiment, the lump parts 2 may be placed at predetermined intervals or at irregular intervals. In other words, the lump parts 2 may be regularly or randomly provided.

When the lump parts 2 are regularly provided, the lump parts 2 are placed over the entire surface of the wear-resistant coating film 10 with the adjacent lump parts 2 provided at a specific interval.

Figure 2:
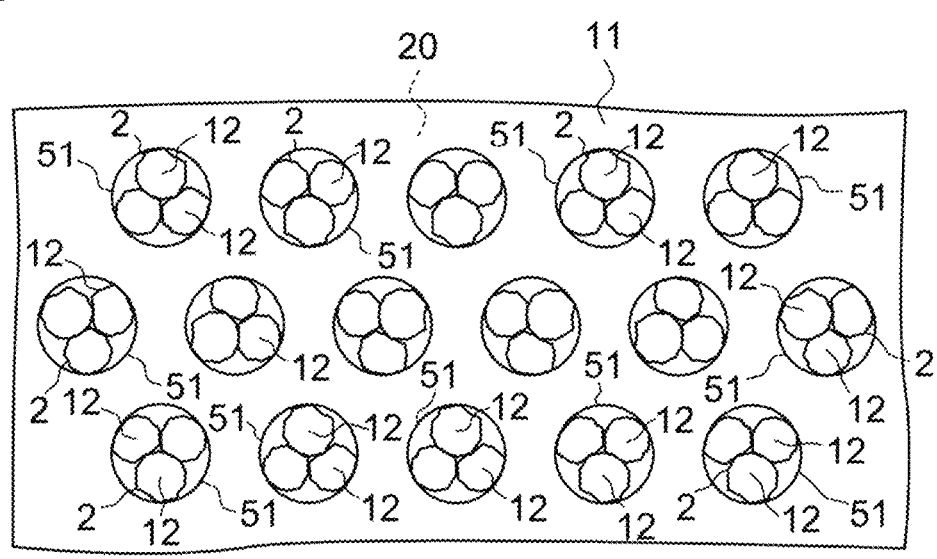
FIG. 2 is a plan view showing an example of a wear-resistant component comprising the wear-resistant coating film of the present invention.

FIG. 2 is a plan view of the wear-resistant coating film 10. However, in order to specify the placement of the lump parts 2, the coat layer 13 is omitted in the plan view of the wear-resistant coating film 10 in FIG. 2. Each of the lump parts 2 shown in FIG. 2 is formed of the assembly of particles 12.

As shown in FIG. 2, in the wear-resistant coating film 10, the lump parts 2 can be placed so that all the intervals between the lump parts 2 are equally spaced. In the wear-resistant coating film 10 of the present invention, the intervals of the lump parts 2 are not necessarily equally spaced. The lump parts 2 may be placed at regular or irregular intervals.

When the lump parts 2 are equally spaced, the distance between adjacent lump parts 2 can be 10 μm or more, preferably 50 μm or more, and more preferably 100 μm or more. The distance between adjacent lump parts 2 means the shortest distance between one lump part 2 and another lump part 2 in the adjacent lump parts 2. The upper limit of the distance between adjacent lump parts 2 is not particularly limited, and is, for example, 1000 μm, preferably 800 μm, more preferably 600 μm, and particularly preferably 400 μm.

As shown in FIG. 2, in the wear-resistant coating film 10, the lump parts 2 are regularly placed in an island shape. The lump parts 2 can be placed in a state other than the island shape. For example, the lump parts 2 may have a linear or a net-like connecting structure.

When the lump parts 2 are placed at predetermined intervals as in the wear-resistant coating film 10 shown in FIG. 2, a load on the wear-resistant coating film 10 can be reduced because a stress applied during wear is likely to be evenly distributed over all lump parts 2. This further improves the wear resistance of the wear-resistant coating film 10 and ensures higher durability.

In one preferred embodiment of the wear-resistant coating film 10, the lump parts 2 are preferably arranged along a line inclined X° with respect to the sliding direction of the wear-resistant coating film 10 on the plane of the wear-resistant coating film 10. X is a number of from 0 to 15, and refers to "pitch slope."

Figure 3:
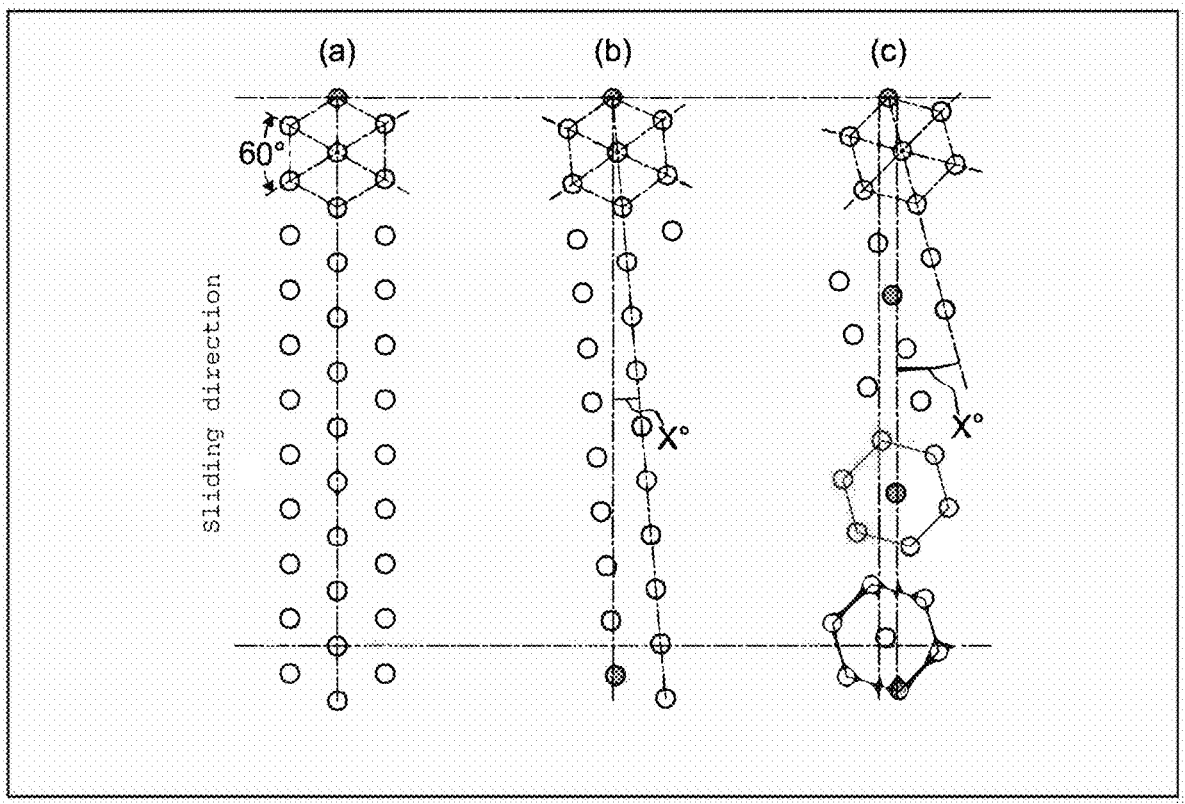
FIG. 3 is a schematic view showing the pitch slope of the lump parts formed on the wear-resistant coating film.

FIG. 3(a) is a schematic view showing the arrangement of lump parts 2 when the pitch slope X=0°, FIG. 3 (b) is a schematic view showing the arrangement of lump parts 2 when the pitch slope X=5°, and FIG. 3 (c) is a schematic view showing the arrangement of lump parts 2 when the pitch slope X=15°. In FIG. 3, the circles represent the lump parts 2.

When the lump parts 2 are arranged along a line inclined X° with respect to the sliding direction of the wear-resistant coating film 10, even if the wear-resistant coating film 10 is subjected to repetitive wear, an area in the width direction (parallel to the sliding direction) that is not affected by wear can be reduced. Thus, the stress is evenly applied to each lump part 2, which reduces the occurrence of groove-like wear, thus further improving the wear resistance of the wear-resistant coating film 10, and ensuring high durability. In particular, wear resistance to sliding, such as rotating on the surface of the wear-resistant coating film 10, is more easily improved.

The method for adjusting the pitch slope is not particularly limited. For example, as described below, the pitch slope can be adjusted by setting a position at which a hole is formed in the resist layer to a predetermined position.

The wear-resistant coating film 10 of the present invention has high wear resistance; in particular, scraping and peeling due to wear do not easily occur even if the surface of the coat layer 13 is subjected to repetitive wear, and high wear resistance can be maintained over a long period of time.

The wear-resistant coating film 10 can be suitably used for various components as a coating film that provides wear resistance, and can form the wear-resistant component 30 as shown in FIG. 1. When each of the various components is coated with the wear-resistant coating film 10, the wear-resistant coating film 10 is provided in such a manner that the coat layer 13 is on the side of the front surface.

The wear-resistant coating film 10 of the present invention, which is provided with the coat layer 13 having high wear resistance, can impart high wear resistance and slidability. In particular, because a plurality of lump parts 2 are included in the wear-resistant coating film 10, the effect of the wear resistance is not easily impaired even when the wear-resistant coating film 10 is subjected to repetitive wear. Accordingly, the wear-resistant coating film 10 of the present invention can maintain a low coefficient of friction throughout the entire range from a low rotation speed to a high rotation speed, and can be applied to various sliding mechanisms.

In the conventional wear-resistant coating film, the coating film is scraped when continuously subjected to wear, and the coat layer gradually disappears, thus losing the wear resistance. However, the wear-resistant coating film 10 of the present invention can maintain wear resistance effects for a longer period of time than before because it has the structure described above. In addition, by flattening the tips of the particles by polishing beforehand to increase the exposed areas of the particles, an increase in the initial wear amount can be reduced.

In particular, if the particles 2 are diamond particles, carbon derived from the diamond particles may be generated by wear, and the generated carbon may enter grooves formed by wear. The carbon that enters these grooves has an effect of a lubricant. Accordingly, due to the carbon that enters the grooves, a kind of lubrication effect is exhibited, which can further improve wear resistance. Due to the lubrication effect of carbon, the wear-resistant coating film 10 of the present invention may be able to provide a lubrication effect without use of a lubricating oil as in the conventional method. Accordingly, the wear-resistant coating film 10 of the present invention also has an advantage of being formed without oil.

In addition to carbon, the lubrication effect can also be exhibited by molybdenum disulfide that can be derived from the plated layer 11, and by polytetrafluoroethylene that can be derived from the coat layer 13.

2. Wear-Resistant Component

As shown in FIG. 1, the wear-resistant component 30 includes a wear-resistant coating film 10 and a base material 20, wherein the base material 20 is coated with the wear-resistant coating film 10, and the wear-resistant coating film 10 is adhered to the base material 20 on the side of the plated layer 11.

In the wear-resistant component 30, the wear-resistant coating film 10 has the same structure as that described in the "1. Wear-resistant Component" section, and the wear-resistant coating film 10 according to this embodiment is used.

Various solid materials can be used for the base material 20, and the kind thereof is not particularly limited. For example, various materials, such as metals (e.g., iron), alloys, resins, and ceramics can be used as the base material 20. The resins are not particularly limited, and known photocurable resins, thermoplastic resins, or thermosetting resins can be used.

A resist layer may be formed on the base material 20, as in a base material used in the process of producing the wear-resistant coating film described below (the resist layer is omitted in FIG. 1).

The shape of the base material 20 is not particularly limited. Examples of the shape of the base material 20 include substrates, films, rods, blocks, spheres, elliptical spheres, distorted shapes, and the like. The base material 20 may be a machine part, tool, mold, bearing, sleeve, or the like. A portion of the base material 20 coated with the wear-resistant coating film 10 may be flat or non-flat (e.g., uneven, rough, or corrugated shape).

The wear-resistant component 30 can be formed by directly adhering the wear-resistant coating film 10 to the base material 20. Alternatively, the wear-resistant component 30 may be formed by interposing another layer between the wear-resistant coating film 10 and the base material 20.

Since the wear-resistant component 30 of the present invention includes the wear-resistant coating film 10, high wear resistance can be maintained for a long period of time even when the component is subjected to repetitive wear.

The wear-resistant coating film 10 and the wear-resistant component 30 of the present invention can be suitably used for various components. Examples of applicable components include various machine parts, tools, molds, and the like. Additional examples are various sliding components that are used for home appliances, industrial machinery, cargo aircraft, or leisure equipment.

3. Method for Producing Wear-Resistant Coating Film

The method for forming the wear-resistant coating film 10 according to this embodiment is not particularly limited. The wear-resistant coating film 10 can be produced by various methods as long as the methods have the structure described above. The method for forming the wear-resistant coating film 10 on the base material 20 will be explained below as one example.

The method for producing the wear-resistant coating film 10 comprises the following steps in this order: providing holes 51 for placing the lump parts 2 on the base material 20 (abbreviated below as "step 1"), placing the lump parts 2 in the holes 51 (abbreviated below as "step 2"), performing a first plating treatment to form a plated layer 11 (abbreviated below as "step 3"), and performing a second plating treatment on the plated layer 11 to form a coat layer 13 (abbreviated below as "step 4").

The base material 20 used in step 1 can be the same as the base material 20 included in the wear-resistant component 30.

Figure 4:
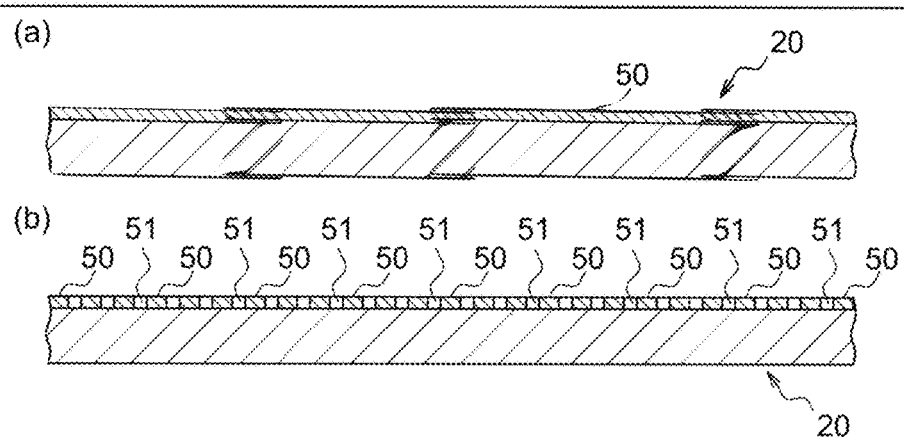
FIG. 4 is a schematic view explaining an example of a method for producing the wear-resistant coating film of the present invention.

As shown in FIG. 4(a), a resist layer 50 may be formed on the base material 20 used in step 1. The resist layer 50 is not particularly limited, and various known resist layers can be used. For example, a film formed of a photocurable resin with a thickness of about 1 to 40 μm can be used as the resist layer 50.

The method for forming the holes 51 in step 1 is not particularly limited, and various known methods can be used. When the resist layer 50 is formed on the base material 20, the holes 51 with a desired size and number can be formed on the resist layer 50 at desired intervals by subjecting the resist layer 50 to a masking treatment. The masking method is not particularly limited, and various known masking methods, such as a method of forming a pattern on the resist layer 50 by an exposure method, can be used. For example, by adjusting masking conditions, all the holes 51 can be formed at equally spaced intervals. In this case, a wear-resistant coating film 10 containing regularly arranged lump parts 2 can be formed. In addition, by adjusting masking conditions, the pitch slope described above can be set to a desired range.

FIG. 4(b) shows a state after the masking treatment is performed on the base material 20 on which the resist layer 50 has been formed, as shown in FIG. 4(a). When the holes 51 are formed by masking the resist layer 50 as mentioned above, the holes 51 are formed to penetrate the resist layer 50, and the holes 51 are not formed in the base material 20.

The size of each hole 51 is not particularly limited. For example, when the shape on the plane view of the hole 51 is regarded as a circle, its diameter can be 20 μm or more. The height (thickness) of the hole 51 is not limited, and is, for example, 1 to 40 μm.

In step 2, the lump parts 2 are placed in the holes 51.

The method for placing the lump parts 2 is not particularly limited. For example, by placing the particles 12 in the holes 51 and performing electroplating in this state, the particles 12 can be adhered to the base material 20, which makes it possible to form the lump parts 2. This electroplating treatment forms a plated layer between the particles 12 and the base material 20. The plated layer between the particles 12 and the base material 20 is the first layer described above.

The particles to be used in step 2 are the same as the particles 12 explained in the "1. Wear-resistant Coating Film" section.

The kind of electroplating film (the first layer) that is formed to adhere the particles 12 to the holes 51 is not particularly limited. Examples include an electroplating film with an Hv of 200 to 500 (e.g., a nickel-plated film with an Hv of 200 to 500).

In step 2, when a particle 12 having a particle size smaller than the radius of the hole 51 is used to form a lump part 2, the lump part 2 is formed by an assembly of particles 12. When a particle 12 having a particle size larger than the radius of the hole 51 and smaller than the diameter of the hole 51 is used to form a lump part 2, the lump part 2 is formed of a single particle 12.

After the lump parts 2 are placed, the resist layer 50 can be removed if necessary. The method of removing the resist layer 50 is not particularly limited, and various known methods can be used. The removal of the resist layer 50 may be performed in any step as long as it is performed after step 2.

In step 3, the first plating treatment is performed to form the plated layer 11. Specifically, the first plating treatment is performed on the lump part 2 side surface of the base material 20 on which the lump parts 2 obtained in step 2 have been formed. By this treatment, the plated layer 11 is formed. The plated layer 11 can be formed on all areas where the lump parts 2 are not placed in the base material 20.

The first plating treatment method is not particularly limited. Usable examples of plating methods include conventionally known electroplating, electroless plating, hot-dip plating, gas-phase plating, and the like. The plating treatment may be performed either continuously or in batches.

In the first plating treatment, a plated layer of any of various metals can be formed. Examples of metals include nickel, zinc, cobalt, tin, copper, and silver. Examples of the first plating treatment include electroplating and/or electroless nickel plating.

By the first plating treatment, the plated layer 11 is formed, and the lump parts 2 are more firmly held. The plated layer 11 can be formed to have a two-layer structure including the first layer and a layer formed by the first plating treatment. The layer formed by the first plating treatment corresponds to the second layer described above. The plated layer 11 is not limited to the layer having such a two-layer structure, and can be a single layer formed by the first plating treatment.

The first plating treatment is performed so that a portion of each lump part 2 protrudes above the surface of the plated layer 11 formed by the first plating treatment. For example, the first plating treatment can be performed so that more than half of the total thickness of the lump part 2 protrudes above the surface of the plated layer 11.

The lump parts 2 are more firmly held on the base material 20 by the plated layer 11 formed by the first plating treatment.

In step 4, a second plating treatment is performed on the plated layer 11 to form a coat layer 13.

The second plating treatment method is also not particularly limited. Usable examples of plating methods include conventionally known electroplating, electroless plating, hot-dip plating, gas phase plating, and the like. The plating treatment may be performed continuously or in batches.

The second plating treatment is preferably an electroless plating treatment because the coat layer 13 can be easily formed.

The second plating treatment can be performed using resin, metal, and like materials. In particular, in the second plating treatment, it is preferable to form a plated layer containing at least one member selected from the group consisting of chromium, silver, polytetrafluoroethylene-nickel composites, nickel, tin, and copper. In this case, a wear-resistant coating film 10 with higher wear resistance can be easily obtained. The second plating treatment is preferably an electroless plating treatment.

By the second plating treatment, the lump parts 2 and the plated layer 11 formed by the first plating treatment are coated with the coat layer 13. The second plating treatment can also be performed so that all of the lump parts 2 that protrude from the plated layer 11 are coated with the coat layer 13.

After step 4, by grinding the coat layer 13 by a grinding process or the like, and by grinding the lump parts 2 at the same time, flat portions 18 can be formed in the lump parts 2. By this treatment, a wear-resistant coating film 10 in which the flat portions 18 are formed in the lump parts 2, and the flat portions 18 are formed on the same plane as the surface of the coat layer 13, is formed.

By the production method comprising steps 1 to 4 in this order, the wear-resistant coating film 10 according to this embodiment can be produced, and the wear-resistant coating film 10 is formed on the base material 20 to yield a wear-resistant component 30.

4. Sliding Mechanism

The sliding mechanism of the present invention includes a first sliding component and a second sliding component. In the sliding mechanism of the present invention, the first sliding component is the wear-resistant component of the present invention described above.

In the sliding mechanism of the present invention, the second sliding component is not particularly limited. Specifically, as long as the second sliding component is a base material having a sliding surface, various known sliding components can be used. For the base material in the second sliding component, a various known base material can be used. Examples include a base material similar to the base material in the wear-resistant component of the present invention, which is the first sliding component.

In particular, in the second sliding component, it is preferable that the sliding surface is coated with a hard metal layer, and grooves are formed on the surface of the hard metal layer. In this case, the aforementioned lubricant generated by wear can easily enter the grooves of the second sliding component, and lubrication effects are easily exhibited. Thus, the slidability of the sliding mechanism is easily improved and high durability is attained. In particular, the hard metal layer preferably includes chrome. In this case, since the lubricant, such as carbon, can easily enter the grooves, the lubrication effect is further enhanced. The amount of chromium in the hard metal layer is 50 mass % or more, preferably 80 mass % or more, more preferably 90 mass % or more, and particularly preferably 99 mass % or more.

The second sliding component has a sliding surface hardness, e.g., a Rockwell hardness, of 55 to 68, and preferably 58 to 65. When the sliding surface of the second sliding component is coated with a hard metal layer, the surface hardness, e.g., a Rockwell hardness, can be 50 to 68, and is preferably 64 to 67.

The depth of the grooves formed on the surface of the hard metal layer can be, for example, 5 to 50 μm. In this case, the lubricant easily enters the grooves, and the lubrication effect is easily exhibited.

The material of the lubricant that enters the grooves is, for example, at least one material selected from the group consisting of carbon, molybdenum disulfide, and polytetrafluoroethylene. Of these, carbon is particularly preferable.

EXAMPLES

The present invention will be described in more detail with reference to examples, but the present invention is not limited to these examples.

Wear-Resistant Component

Example 1

S50C was prepared as a base material, and a resist layer with a thickness of 10 μm was formed on the base material. The resist layer was formed by applying a photocurable resin to the base material by a coating method. By forming a pattern on the resist layer on the base material by an exposure method, cylindrical holes having a diameter of 50 μm were formed on the resist layer at an interval of 40 μm. The holes were formed in the island shape on the base material.

Subsequently, diamond with an average primary particle size of 20 μm as a particle was pressed against the surface of the base material, and an electro-nickel plating treatment was performed to adhere the diamond to the holes by using a nickel-plated layer (2 μm), thereby placing the lump parts in the holes. Each lump part was formed as the assembly of diamond particles. Next, an electroless nickel plating treatment was performed under general plating conditions to form an electroless nickel-plated layer (hard nickel-plated layer) with a thickness of 7 μm. The lump parts were thereby held on the base material 20 by the plated layer. The plated layer was formed to have a two-layer structure, i.e., the nickel-plated layer (2 μm) and the electroless nickel-plated layer (hard nickel-plated layer).

Polytetrafluoroethylene (PTFE) particle-containing composite electroless nickel plating was performed on the base material on which the plated layer had been formed as described above. By this treatment, all the lump parts and the plated layer were coated with a coat layer having a thickness of 15 to 20 μm. The coat layer was then subjected to grinding to shave the coat layer and the portions of the lump parts, thus forming flat portions in the lump parts. The grinding was performed so that the flat portions were placed on the same plane as the coat layer. The resultant was obtained as a wear-resistant component. The cross-section of the wear-resistant component was observed by SEM. It was confirmed that the protrusion height of each flat portion relative to the coat layer was less than 0.1 μm, and that the flat portions were placed on the same plane as the coat layer.

Comparative Example 1

S50C was prepared as a base material, and diamond with an average primary particle size of 20 μm as a particle was pressed against the surface of the base material. An electro-nickel plating treatment was performed to adhere the diamond to the base material by using a nickel-plated layer (2 μm). Subsequently, an electroless nickel plating treatment was performed under general plating conditions to form an electroless nickel-plated layer (hard nickel-plated layer) with a thickness of 7 μm. By this treatment, the particles were held on the base material by the plated layer. The plated layer was formed to have a two-layer structure, i.e., the nickel-plated layer (2 μm) and the electroless nickel-plated layer (hard nickel-plated layer).

Polytetrafluoroethylene (PTFE) particle-containing composite electroless nickel plating was performed on the base material on which the plated layer had been formed as described above. By this treatment, all the particles and the plated layer were coated with the coat layer having a thickness of 15 to 20 μm, and the resultant was obtained as a wear-resistant component.

Wear Resistance Test

The wear resistance test of the wear-resistant component was performed according to the following conditions.

Wear resistance test method: Block-on-ring method
Load: 20 N
Opposite material: Cast iron (FC250)
Rotation speed: 300 rpm
Wear time: 1800 sec.
Temperature: 25° C.
Relative humidity: 50%.

Wear resistance tests were conducted on the wear-resistant components obtained in Examples and Comparative Examples. The amount of wear (depth of wear) and the coefficient of friction from the start of the measurement to 1800 seconds were measured.

Figure 5:
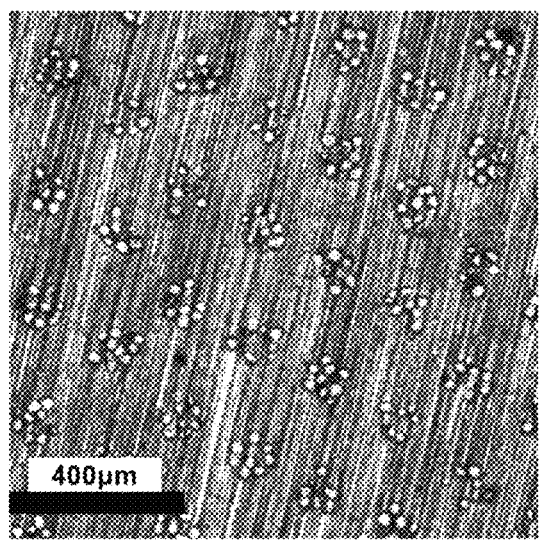
FIG. 5 is a planar image of the wear-resistant component obtained in Example 1 by microscopic observation.

FIG. 5 is a planar image of the wear-resistant component obtained in Example 1 by microscopic observation.

Figure 6:
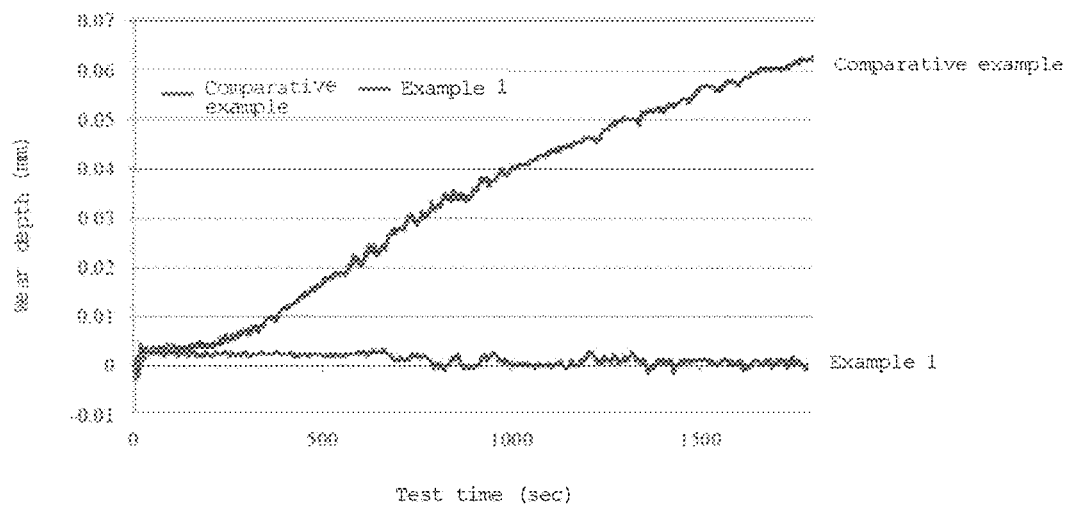
FIGS. 6(a) and 6(b) show the results of the wear resistance test.
Figure 6:
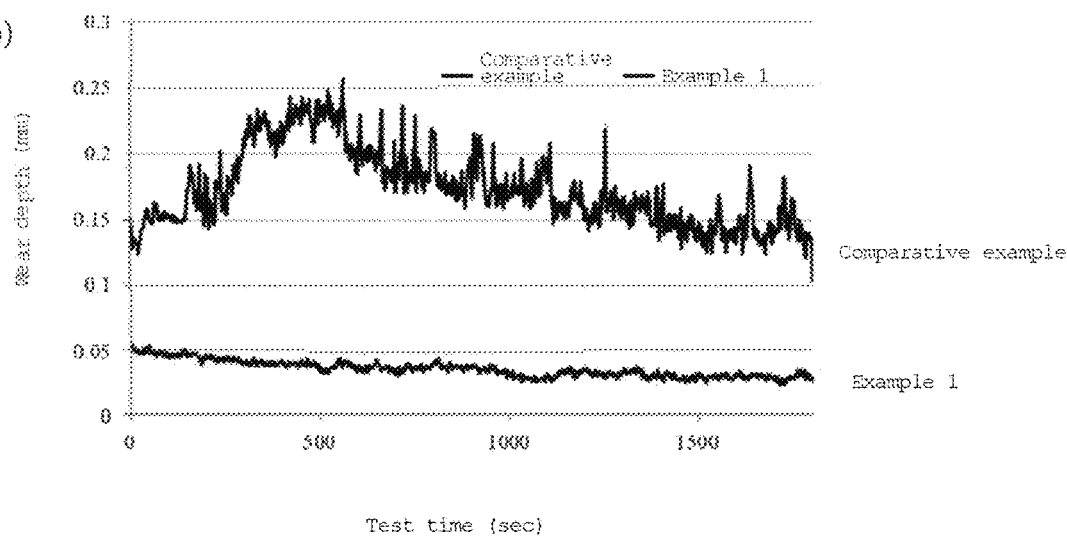

FIG. 6 shows the results of the wear resistance test. FIG. 6(a) shows the measurement results of the wear depth and FIG. 6(b) shows the measurement results of the coefficient of friction.

The results in FIG. 6 indicate that the wear-resistant component obtained in Example 1 has a smaller amount of wear (depth of wear) and a smaller coefficient of friction than those of the wear-resistant component of Comparative Example 1. Accordingly, it was found that the wear-resistant component of Example 1 includes a wear-resistant coating film that can maintain high wear resistance over a long period of time even when the film is subjected to repetitive wear.

Sliding Mechanism

Example 2

S50C was prepared as a base material, and a resist layer with a thickness of 10 μm was formed on the base material. The resist layer was formed by applying a photocurable resin to the base material by a coating method. By forming a pattern on the resist layer on the base material by an exposure method, cylindrical holes having a diameter of 80 μm were formed at an interval of 200 μm on the resist layer. The holes were formed in the island shape on the base material. The holes were formed in such a manner that the pitch slope was 15°.

Subsequently, diamond with an average primary particle size of 30 μm as a particle was pressed against the surface of the base material, and an electro-nickel plating treatment was performed to adhere the diamond to the holes by using a nickel-plated layer (5 to 10 μm), thereby placing the lump parts in the holes. Each lump part was formed as the assembly of diamond particles. Next, an electroless nickel plating treatment was performed under general plating conditions to form a coat layer with a thickness of 10 to 20 μm. By this treatment, all the lump parts and the plated layer were coated with the coat layer. The coat layer was then subjected to grinding to shave the coat layer and the portions of the lump parts, thus forming flat portions in the lump parts. The grinding was performed so that the flat portions were placed on the same plane as the coat layer. The resultant was obtained as the first sliding component. The cross-section of the first sliding component was observed by SEM. It was confirmed that the protrusion height of each flat portion relative to the coat layer was less than 0.1 μm, and that the flat portions were placed on the same plane as the coat layer.

A hard chromium layer with a thickness of 50 μm was formed on the front layer of the base material (FC250) by hard chromium plating, thus obtaining a second sliding component. Fine grooves with a width of 0.2 to 0.5 μm and a depth of 5 to 50 μm were formed on the hard chromium layer of the second sliding component over the entire length of the second sliding component.

A sliding mechanism was formed using the first sliding component and the second sliding component obtained as above, and the wear resistance was evaluated.

Example 3

S50C was prepared as a base material, and a resist layer with a thickness of 10 μm was formed on the base material. The resist layer was formed by applying a photocurable resin to the base material by a coating method. By forming a pattern on the resist layer on the base material by an exposure method, cylindrical holes with a diameter of 120 μm were formed at an interval of 200 μm on the resist layer. The holes were formed in the island shape on the base material. The holes were formed in such a manner that the pitch slope was 15°.

Subsequently, diamond with an average primary particle size of 30 μm as a particle was pressed against the surface of nickel-plated layer (5 to 20 μm), thereby placing the lump parts in the holes. Each lump part was formed as the assembly of diamond particles. Subsequently, an electroless nickel plating treatment was performed under general plating conditions to form a coat layer with a thickness of 20 to 40 μm. By this treatment, all the lump parts and the plated layer were coated with the coat layer. Next, the coat layer was subjected to grinding to shave the coat layer and the portions of the lump parts, thus forming flat portions in the lump parts. The grinding was performed so that the flat portions were placed on the same plane as the coat layer. The resultant was obtained as the first sliding component. The cross-section of the first sliding component was observed by SEM. It was confirmed that the protrusion height of each flat portion relative to the coat layer was less than 0.1 μm, and the flat portions were placed on the same plane as the coat layer.

A hard chromium layer with a thickness of 50 μm was formed on the front layer of the base material (FC250) by hard chromium plating, thus obtaining a second sliding component. Fine grooves with a width of 0.2 to 0.5 μm and a depth of 5 to 50 μm were formed on the hard chromium layer of the second sliding component over the entire length of the second sliding component.

A sliding mechanism was formed using the first sliding component and the second sliding component obtained as above, and the wear resistance was evaluated.

Example 4

A sliding mechanism was formed in the same manner as in Example 2, except that the second sliding component was changed to steel that was subjected to a heat treatment so that it had a surface hardness, i.e., a Rockwell hardness, in the range of 55 to 68 HRC. The wear resistance was then evaluated.

Example 5

A sliding mechanism was formed in the same manner as in Example 3, except that the second sliding component was changed to steel that was subjected to a heat treatment so that it had a surface hardness, i.e., a Rockwell hardness, in the range of 55 to 68 HRC. The wear resistance was then evaluated.

Comparative Example 2

Referring to Example 1 in JP2017-088978A, a nickel-phosphorus composite plating with a thickness of 15 μm was formed on the sliding surface of an aluminum base material. In the nickel-phosphorus composite plating, 3 mass % of nanodiamond particles (average primary particle size of 4 nm and average secondary particle size of 40 nm) and 5 mass % of polytetrafluoroethylene particles were uniformly dispersed. A sliding mechanism was formed in the same manner as in Example 2, except that the nickel-phosphorus composite plating was used as the first sliding component, and the wear resistance was evaluated.

Comparative Example 3

A sliding mechanism was formed in the same manner as in Example 2, except that a cemented carbide (WC-6% Co) base plate coated with a diamond film in accordance with Example 1 in JP2008-063606 was used as the first sliding component. The wear resistance was then evaluated.

Comparative Example 4

A sliding mechanism was formed in the same manner as in Comparative Example 2, except that the second sliding component was changed to steel that was subjected to a heat treatment so that it had a surface hardness, i.e., a Rockwell hardness, in the range of 55 to 68 HRC. The wear resistance was then evaluated.

Comparative Example 5

A sliding mechanism was formed in the same manner as in Comparative Example 3, except that the second sliding component was changed to steel that was subjected to a heat treatment so that it had a surface hardness, i.e., a Rockwell hardness, in the range of 55 to 68 HRC. The wear resistance was then evaluated.

The wear resistance tests of the sliding mechanisms of Examples 2 to 5 and Comparative Examples 2 to 5 were performed according to the following conditions.

Wear resistance test method: Block-on-ring method
Load: 30 to 180 N
Rotation speed: 300 rpm
Wear time: 1800 sec
Temperature: 25° C.
Relative humidity: 50%.

Figure 7A:
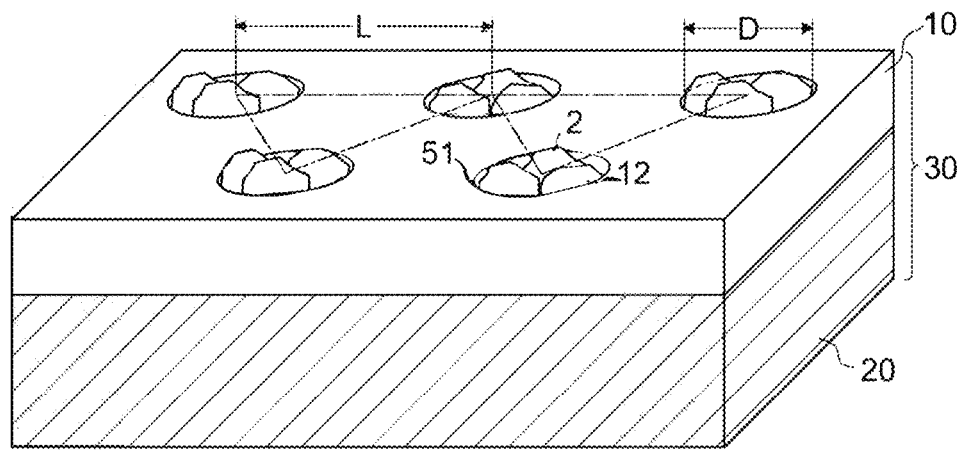
FIGS. 7(a) and 7(b) show schematic diagrams illustrating the outlines of the first sliding components in the sliding mechanisms obtained in Examples 2 to 5.
Figure 7B:
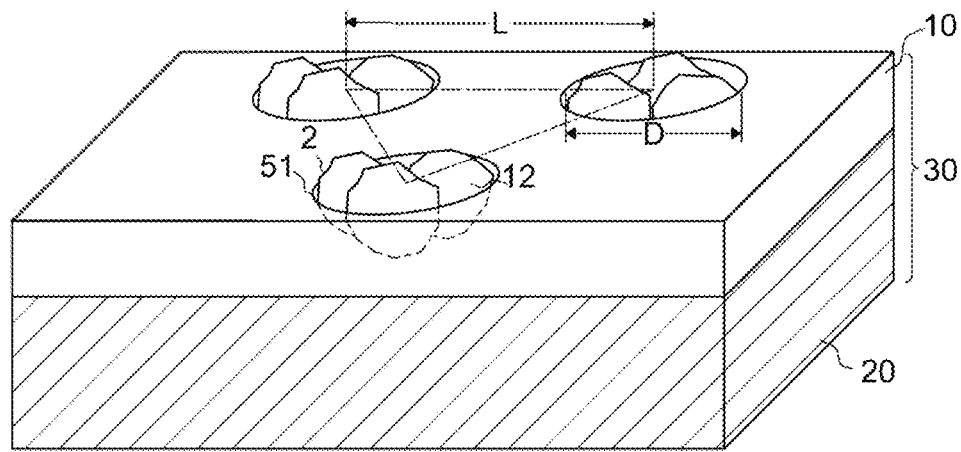

FIG. 7 shows schematic diagrams illustrating the outlines of the first sliding components in the sliding mechanisms obtained in Examples 2 to 5. FIG. 7 (a) shows the first sliding component of Example 2 or 4 and FIG. 7(b) shows the first sliding component of Example 3 or 5. In FIG. 7(a), L=200 μm and D=80 μm, and in FIG. 7(b), L=200 μm and D=120 μm.

Figure 8:
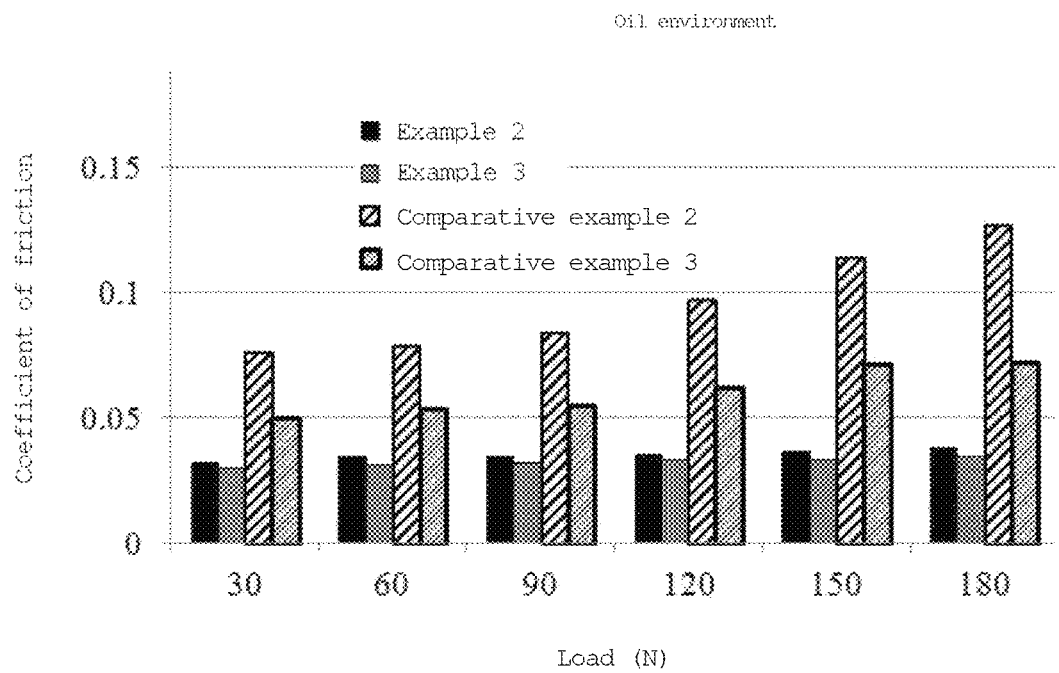
FIG. 8 shows the friction and wear test results of the sliding mechanisms of Examples 2 and 3 and Comparative Examples 2 and 3 in an oil environment.
Figure 9:
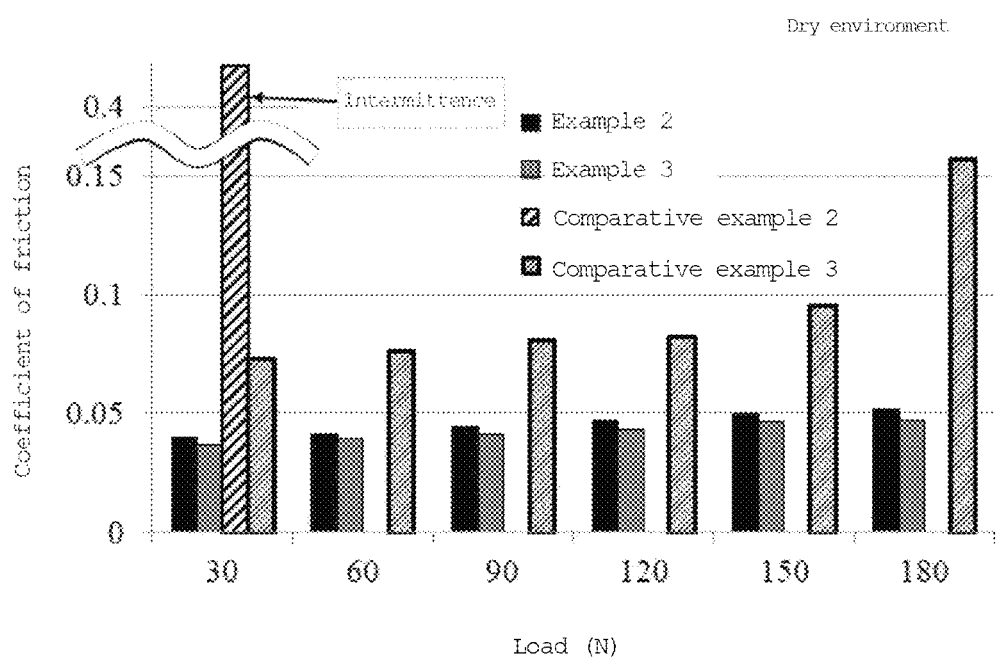
FIG. 9 shows the friction and wear test results of the sliding mechanisms of Examples 2 and 3 and Comparative Examples 2 and 3 in a dry environment.

FIG. 8 shows the friction and wear test results of the sliding mechanisms of Examples 2 and 3 and Comparative Examples 2 and 3 in an oil environment. FIG. 9 shows the friction and wear test results of the sliding mechanisms of Examples 2 and 3 and Comparative Examples 2 and 3 in a dry environment. In the oil environment conditions, 2 mL of Daphne Mechanic Oil 32 produced by Idemitsu Kosan Co., Ltd., was added dropwise to an oil reservoir in a wear resistance test apparatus in advance, and the second sliding component was left idle to ensure that the oil was spread over the entire surface of the component. Using this sliding component, a sliding mechanism was formed.

FIGS. 8 and 9 showed that the sliding mechanisms of Examples 2 and 3 had high wear resistance compared to the sliding mechanisms of Comparative Examples 2 and 3 both in an oil environment and in a dry environment.

Figure 10:
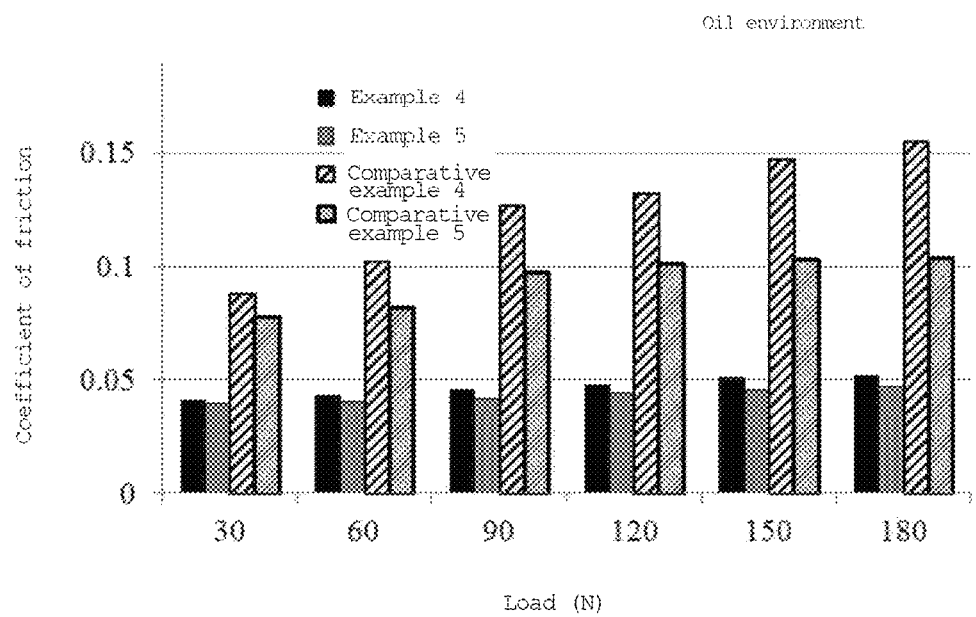
FIG. 10 shows the friction and wear test results of the sliding mechanisms of Examples 4 and 5 and Comparative Examples 4 and 5 in an oil environment.
Figure 11:
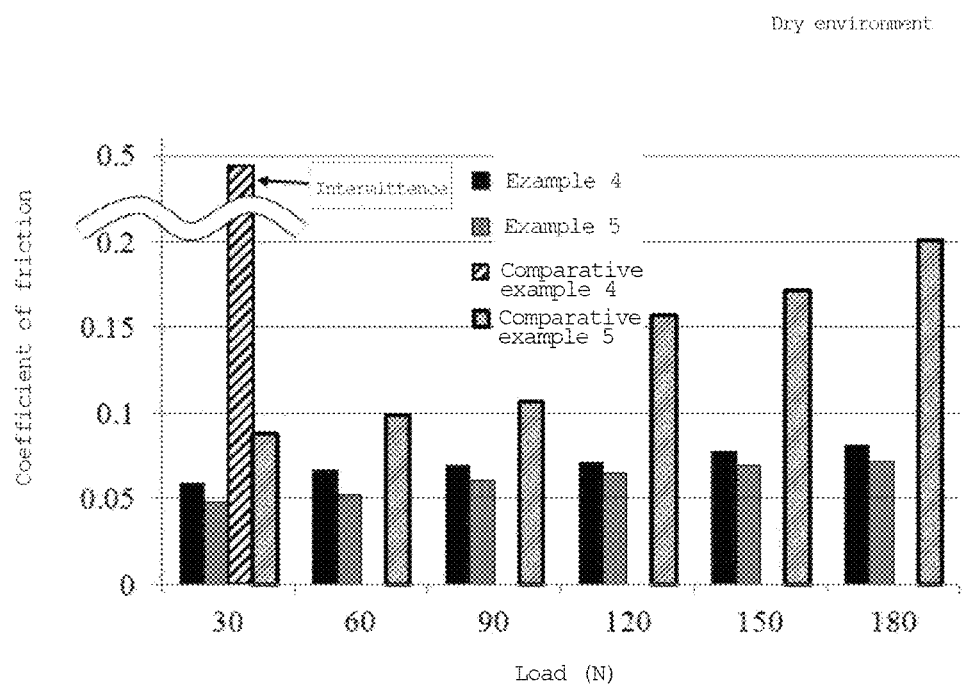
FIG. 11 shows the friction and wear test results of the sliding mechanisms of Examples 4 and 5 and Comparative Examples 4 and 5 in a dry environment.

FIG. 10 shows the friction and wear test results of the sliding mechanisms of Examples 4 and 5 and Comparative Examples 4 and 5 in an oil environment. FIG. 11 shows the friction and wear test results of the sliding mechanisms of Examples 4 and 5 and Comparative Examples 4 and 5 in a dry environment.

FIGS. 10 and 11 show that the sliding mechanisms of Examples 4 and 5 had high wear resistance compared to the sliding mechanisms of Comparative Examples 4 and 5 both in an oil environment and a dry environment.

Figures 12A, 12B:
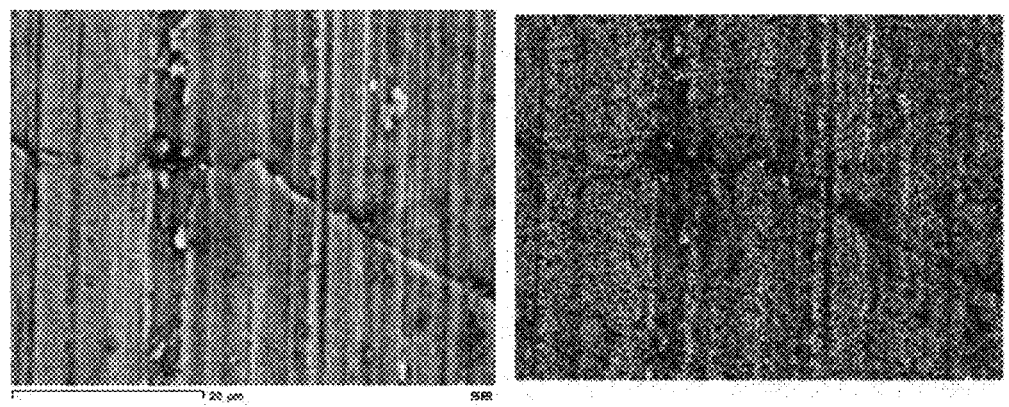
FIG. 12 (a) shows an enlarged SEM image of the surface of the second sliding component obtained after the test under dry conditions in Example 3 and FIG. 12 (b) shows a mapping image of carbon elements in the image of FIG. 12(a).

FIG. 12 shows an enlarged SEM image (FIG. 12(a)) of the second sliding component obtained after the test under dry conditions in Example 3, and mapping (FIG. 12(b)) of carbon elements in the image of FIG. 12(a). FIG. 12 reveals that a large amount of fine carbon can be placed in fine grooves (0.2 to 0.5 μm) formed on the surface of the second sliding component. This carbon element is derived from diamond particles and is generated by wear. It is presumed that since such carbon can be held in the grooves, the carbon can function as a solid lubricant, and the lubricating properties of the sliding mechanism is further improved.

Figure 13:
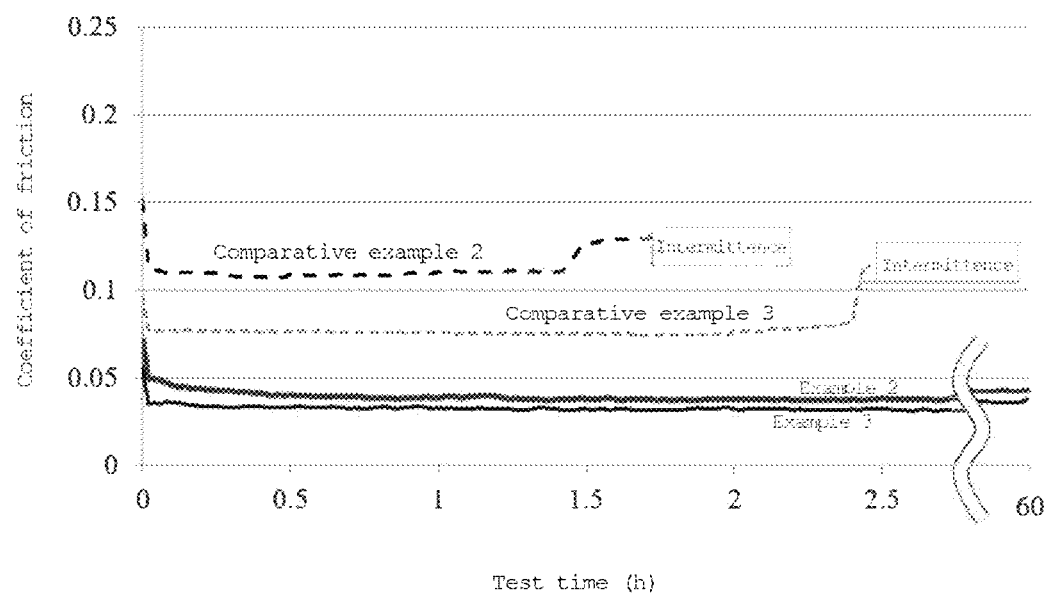
FIG. 13 shows the results of the friction and wear tests of the sliding mechanisms of Examples 2 and 3 and Comparative Examples 2 and 3 performed under a load of 150 N and a rotation speed of 300 rpm for up to 60 hours in an oil environment.

FIG. 13 shows the results of the friction and wear tests of the sliding mechanisms of Examples 2 and 3 and Comparative Examples 2 and 3 performed under a load of 150 N and a rotation speed of 300 rpm for up to 60 hours in an oil environment. FIG. 13 indicates that the coefficient of friction of the sliding mechanisms of Examples 2 and 3 did not significantly change from around 0.05 when the tests were conducted for 60 hours. In contrast, Comparative Examples 2 and 3 showed a coefficient of friction exceeding 0.1 at an early stage.

EXPLANATION OF SYMBOLS

2: Lump part
10: Wear-resistant coating film
11: Plated layer
12: Particle
13: Coat layer
18: Flat portion
20: Base material
30: Wear-resistant component
51: Hole

The invention claimed is:
1. A wear-resistant coating film comprising a plated layer, lump parts, and a coat layer,
wherein
the plated layer and the coat layer are laminated in this order,
each of the lump parts is formed of a single particle and/or an assembly of particles,
the lump parts are held by the plated layer,
each of the lump parts protrudes above a surface of the plated layer,
the coat layer is formed to coat the surface of the plated layer, the coat layer includes at least one member selected from the group consisting of chromium, silver, polytetrafluoroethylene-nickel composites, nickel, nickel-phosphorus, tin, and copper, the lump parts have flat portions that are exposed on surfaces of the lump parts, and the flat portions are placed on the same plane as the surface of the coat layer, and surfaces of the flat portions protrude above the surface of the coat layer by a distance of 3 μm or less.

2. The wear-resistant coating film according to claim 1, wherein the lump parts are placed at predetermined intervals.

3. The wear-resistant coating film according to claim 1, wherein the particle includes at least one member selected from the group consisting of diamond particles, carbon particles, polytetrafluoroethylene particles, and molybdenum disulfide particles.

4. A wear-resistant component comprising the wear-resistant coating film according to claim 1 and a base material, wherein the base material is coated with the wear-resistant coating film, and the wear-resistant coating film on the plated layer side is adhered to the base material.

5. A method for producing the wear-resistant coating film according to claim 1, comprising the following steps in this order:

making, on a base material, holes for placing the lump parts;

placing the lump parts on the holes;

performing a first plating treatment to form the plated layer; and performing a second plating treatment to form the coat layer on the plated layer.

6. A sliding mechanism comprising a first sliding component and a second sliding component, wherein the first sliding component is the wear-resistant component according to claim 4.

7. The sliding mechanism according to claim 6, wherein the second sliding component has a sliding surface coated with a hard metal layer, and grooves are formed on the surface of the hard metal layer.

8. The sliding mechanism according to claim 7, wherein the grooves have a depth of 5 to 50 μm.

9. The sliding mechanism according to claim 7, wherein the hard metal layer comprises chromium.

10. The wear-resistant coating film according to claim 1, wherein surfaces of the flat portions are level with the surface of the coat layer.

11. The wear-resistant coating film according to claim 1, wherein the coat layer consists of the at least one member selected from the group consisting of chromium, silver, polytetrafluoroethylene-nickel composites, nickel, nickel-phosphorus, tin, and copper, and optionally at least one resin selected from the group consisting of polytetrafluoroethylene, tetrafluoroethylene-perfluoroalkyl vinyl ether copolymer, tetrafluoroethylene-hexafluoropropylene copolymer, polychlorotrifluoroethylene, and tetrafluoroethylene-ethylene copolymer.

12. The wear-resistant coating film according to claim 1, wherein the lump part has an average diameter of 10 to 50 μm.

13. The wear-resistant coating film according to claim 1, wherein the lump parts protrude above the surface of the plated layer toward the coat layer side by more than half of a total thickness of the lump parts.

* * * * *